United States Patent [19]

Molgaard

[11] 4,324,196

[45] Apr. 13, 1982

[54] THERMOSTAT ATTACHMENT FOR A RADIATOR VALVE

[75] Inventor: Aage Mølgaard, Nordborg, Denmark

[73] Assignee: Danfoss A/S, Nordborg, Denmark

[21] Appl. No.: 178,101

[22] Filed: Aug. 14, 1980

[30] Foreign Application Priority Data

Aug. 14, 1980 [DE] Fed. Rep. of Germany ....... 2932884

[51] Int. Cl.$^3$ .............................................. F16K 27/08
[52] U.S. Cl. ..................................... 116/277; 137/383
[58] Field of Search ................ 116/277; 137/551, 383, 137/384.2, 382, 385; 251/90, 89

[56] References Cited

U.S. PATENT DOCUMENTS

| | | | |
|---|---|---|---|
| 929,973 | 8/1909 | McNutt | 137/383 |
| 2,206,707 | 7/1940 | Shaw | 137/382 |
| 3,532,111 | 10/1970 | Hansen | 137/385 |
| 3,618,400 | 11/1971 | Hull | 116/227 |
| 3,700,208 | 10/1972 | Hansen | 251/90 |
| 4,253,488 | 3/1981 | Leverberg | 137/382 |

FOREIGN PATENT DOCUMENTS 799493  4/1936  France ................. 137/382

*Primary Examiner*—Robert I. Smith
*Attorney, Agent, or Firm*—Wayne B. Easton

[57] ABSTRACT

The invention relates to a thermostat unit adapted to be attached to a radiator valve of the type having a rotatable adjusting spindle and a surrounding ring shaped housing portion. The thermostat has a rotary knob unit with a body portion and a smaller diameter neck portion which connects to the valve spindle. The thermostat has a base unit with a supporting ring portion which surrounds said rotary knob body portion and a tightening ring portion which is attachable to the valve housing. The base unit supporting ring portion provides lateral or transverse support for the knob unit body portion to prevent breaking thereof when the knob unit body portion is subjected to large transverse forces resulting from accidental blows to which the knob unit body portion may be subjected.

9 Claims, 3 Drawing Figures

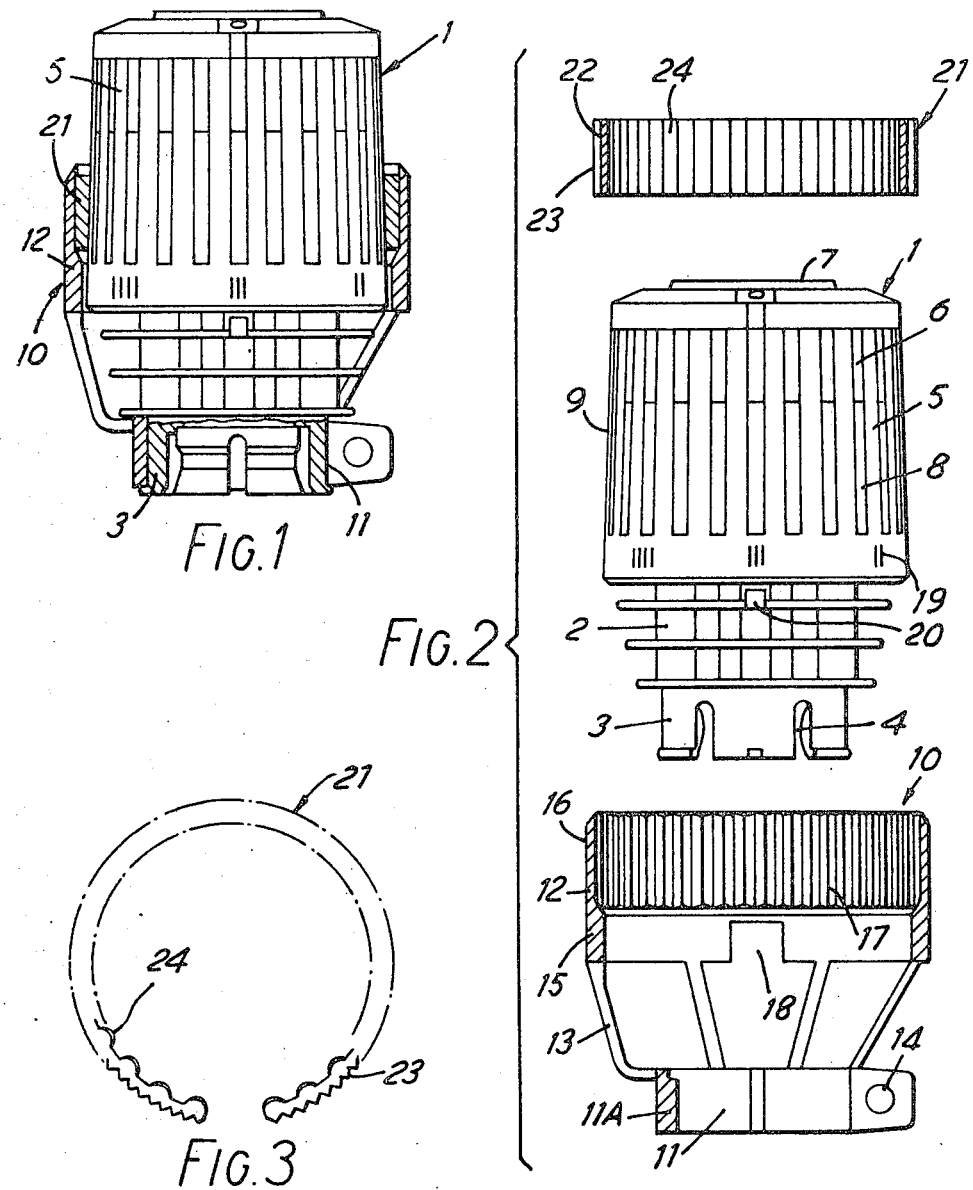

THERMOSTAT ATTACHMENT FOR A RADIATOR VALVE

The invention relates to a thermostat attachment for a radiator valve, comprising a base, a rotary knob engaging over same and having a substantially cylindrical peripheral wall, and a tightening ring which surrounds an elastic neck of the base and serves to secure the base to a valve housing.

In such thermostat attachments, the base consists of plastics material giving a certain amount of heat insulation between the valve housing and the operating element of the thermostat. Since the rotary knob projects relatively far axially beyond the tightening point on the neck of the base, transverse forces applied to the knob give rise to a considerable bending component in the vicinity of the tightening point. On the occurrence of transverse forces of a larger order, particularly on the application of a shock load, it is possible for the base to fracture. This has been frequently observed in schools and other public buildings.

The invention is based on the problem of providing a thermostat attachment of the aforementioned kind in which the danger of breaking the base is practically entirely eliminated.

This problem is solved according to the invention in that the tightening ring is joined to a substantially cylindrical supporting ring which engages around the knob at a small spacing.

In this construction, if the knob is subjected to a transverse force and consequently moves radially, it comes to lie against the supporting ring before an excessive bending moment acts on the base. This avoids the danger of fracture of the base. Since the supporting ring is joined to the tightening ring, the forces acting on the supporting ring can be transmitted direct to the attachment point.

Advantageously, the supporting ring extends over about 40 to 50% of the axial length of the knob. In this way the knob will be supported over a comparatively large proportion of its length. Conversely, such a large portion of the knob projects from the supporting ring that normal adjustment will be possible.

In a preferred embodiment, the tightening ring is split, the supporting ring is not split and both are connected by webs. The undivided supporting ring can closely surround the knob. The split tightening ring can fulfil the usual tightening function. The small amount of relative motion between the tightening ring and supporting ring can be balanced out by way of the webs.

In this case it is advisable for the tightening ring and the supporting ring to be made in one piece of metal. Such a component can, for example, be made by extrusion. It is extremely robust and can take up large supporting forces.

In a further development of the invention, a clamping ring is provided which is insertable in the space between the supporting ring and knob. This clamping ring first of all has the function of filling the gap between the knob and supporting ring so that no lateral movement of the knob is possible at all. In addition, the clamping ring may serve for locking the rotary position of the knob so that no unauthorised person can adjust the desired temperature setting.

In this case it is advisable if the clamping ring is split. It can then be conveniently pushed from the end into the gap between the knob and supporting ring.

In this case the clamping ring may be wedge-shaped in cross-section with rearwardly converging sides. This permits positive clamping of the clamping ring.

Further, the clamping ring may be provided with external teeth and the supporting ring with internal teeth. This will locate the clamping ring on the supporting ring against rotation.

In addition, the clamping ring may have internal ribs engaging in axial slots or grooves of the knob. This also prevents relative rotation between the knob and clamping ring.

In a preferred embodiment, the supporting ring has a window for viewing a scale marking on the knob.

If there are markings on the periphery of the knob, the supporting ring need not obscure the reading thereof.

The invention will now be described in more detail by way of an example illustrated in the drawing, wherein:

FIG. 1 is a side elevation of a thermostat attachment with the supporting ring and clamping ring in cross-section;

FIG. 2 is an exploded view of the three components of FIG. 1, and

FIG. 3 is an underplan of the clamping ring.

A thermostat attachment 1 for a radiator valve comprises as usual a base 2 with a neck 3 which serves for tightening onto a valve housing. It has slots 4 which give it a certain amount of resilience. A rotary knob 5 surrounds a thermostatic operating element which acts on an axially displaceable valve shank. By turning the knob one can adjust the desired value. The sensor of the thermostatic system is connected to the operating element by way of a capillary tube or, as in the present case, disposed in the interior of the knob 5 where it is in contact with the air in the room by slots 6 and one end face 7. The slots 6 merge with grooves 8. The peripheral surface 9 of the knob is slightly conical.

A constructional unit 10 extruded in one piece from metal comprises a split tightening ring 11, an unsplit supporting ring 12 and webs 13 which interconnect the two rings. The tightening ring 11 encloses the neck 3 of the base and will secure same on the valve housing when a tightening screw engaging through the holes 14 is tightened. A projection 11A engages through one slot 4 and in a complementary recess in the valve housing so that the projection is anchored to the valve housing and brings about stiffening of the tightening ring 11. The supporting ring has a section 15 of smaller internal diameter enclosing the knob 5 at a very small spacing and a section 16 of larger diameter provided with internal teeth 17. Through a window 18 in the section 15, one can view a scale marking 19 on the knob 5 which normally co-operates with a fixed marking 20.

A clamping ring 21 is split and has a cross-section 22 which is cylindrical on the outside and has a slightly conical internal surface. Teeth 23 on the outside co-operate with teeth 17 of the supporting ring 12. On the inside there are ribs 24 which can engage in the axial grooves 8 of the knob 5. The height of the clamping ring 21 is shallower than the height of the section 16 of the supporting ring. The supporting ring engages over the knob for about half its axial length.

FIG. 1 shows the assembly of the components 1, 10 and 21. Assembly is undertaken in the following manner. The tightening ring 11 is first pushed over the neck 3 of the base, whereby the supporting ring 12 assumes the illustrated position. The neck of the base is then tightened on the valve housing. The desired intended temperature is now set, whereupon the clamping ring 21 is pushed axially from the end into the gap between the supporting ring and the knob. The knob is now securely held against transverse forces and against unauthorised adjustment. A change in the desired temperature setting calls for either a special tool or loosening of the tightening ring 11.

It will be evident that the supporting function can also be fulfilled without the clamping ring 21, in which case it may be desirable to give the entire length of the supporting ring an internal diameter the same as in the section 15.

What is claimed is:

1. A thermostat unit adapted to be attached to a radiator valve having a rotatable adjusting spindle and a surrounding ring shaped housing portion, comprising, a rotary knob unit having a generally cylindrically shaped body portion and a smaller diameter neck portion for engaging a valve adjusting spindle, and a base unit having a supporting ring portion and a tightening ring portion which surrounds said knob unit neck portion and is attachable to a valve housing.

2. A thermostat unit according to claim 1 wherein said base unit supporting ring portion is axially coextensive with about half of knob unit body portion.

3. A thermostat unit according to claim 1 wherein said tightening ring portion is longitudinally split, and web means connecting said base unit supporting ring and tightening ring portions.

4. A thermostat unit according to claim 3 having a clamping ring insertable between and in abutting engagement with said knob unit body portion and said base unit supporting ring portion.

5. A thermostat unit according to claim 4 wherein said clamping ring is longitudinally split.

6. A thermostat unit according to claim 5 wherein said clamping ring has a tapered cross section which diverges outwardly relative to said base unit.

7. A thermostat unit according to claim 5 wherein said base unit supporting ring and said knob unit body portion have respectively inner and outer teeth means for maintaining said knob unit in a rotatably fixed position relative to said base unit.

8. A thermostat unit according to claim 7 wherein said clamping ring has internal and external teeth means respectively cooperable with said teeth means of said knob unit body portion and said base unit supporting ring.

9. A thermostat unit according to claim 5 wherein said knob unit body portion has scale markings and said base unit supporting ring has an opening through which said scale markings may be viewed.

* * * * *